United States Patent [19]

Srock

[11] Patent Number: 4,685,722
[45] Date of Patent: Aug. 11, 1987

[54] DOOR FOR A MOTOR VEHICLE

[75] Inventor: Rainer Srock, Leonberg, Fed. Rep. of Germany

[73] Assignee: Dr. Ing. h.c.F. Porsche Aktiengesellschaft, Fed. Rep. of Germany

[21] Appl. No.: 819,341

[22] Filed: Jan. 16, 1986

[30] Foreign Application Priority Data

Jan. 16, 1985 [DE] Fed. Rep. of Germany ....... 3501239

[51] Int. Cl.$^4$ .......................... B60J 5/04; B60R 13/04; B60R 19/42
[52] U.S. Cl. .................................... 296/188; 296/207; 296/146; 293/128
[58] Field of Search ............... 296/146, 188, 207, 194; 49/502; 293/122, 128

[56] References Cited

U.S. PATENT DOCUMENTS

| | | | |
|---|---|---|---|
| 2,760,814 | 8/1956 | Watter | 49/502 |
| 2,797,130 | 6/1957 | Renno | 49/502 |
| 3,874,119 | 4/1975 | Renner et al. | 49/502 |
| 3,907,358 | 9/1975 | Barenyi et al. | 296/146 |
| 4,196,929 | 4/1980 | Bauer | 296/146 X |
| 4,300,315 | 11/1981 | Holzwarth | 49/502 X |
| 4,355,841 | 10/1982 | Ghidella et al. | 296/194 X |
| 4,564,232 | 1/1986 | Fujimori et al. | 296/146 |

FOREIGN PATENT DOCUMENTS

| | | |
|---|---|---|
| 2739178 | 3/1979 | Fed. Rep. of Germany . |
| 2952174 | 6/1981 | Fed. Rep. of Germany ...... 296/146 |
| 3151861 | 7/1983 | Fed. Rep. of Germany . |
| 1597263 | 7/1970 | France ................................ 296/146 |
| 1391780 | 4/1975 | United Kingdom ................ 296/146 |
| 2149726 | 6/1985 | United Kingdom ................ 296/146 |

Primary Examiner—Robert B. Reeves
Assistant Examiner—Dennis H. Pedder
Attorney, Agent, or Firm—Barnes & Thornburg

[57] ABSTRACT

A door for a motor vehicle which is provided with an upper outer part having a window cutout and a lower outer part connected with the upper outer part. At least one safety reinforcement constructed as hollow bearer and extending in the vehicle longitudinal direction is arranged in the door. The hollow bearer is connected at each end with the frame structure of the door. The lower door outer part is constructed shell-shaped and formed in one piece with the hollow bearer. At its outer surface, the door outer part is provided with a covering of synthetic resinous material. The hollow bearer has preferably a circularly shaped cross section projecting beyond the lower door outer part and is arranged approximately at the height of the belt line of the vehicle whereby the shell-shaped door outer element extends at least up to this belt line.

9 Claims, 5 Drawing Figures

DOOR FOR A MOTOR VEHICLE

The present invention relates to a motor vehicle door in which at least one safety reinforcement extending in the vehicle longitudinal direction and constructed as a hollow bearer is arranged in the door.

A door for a motor vehicle is described in the DE-OS 31 51 861 which includes a hollow bearer arranged on the inside for safety reinforcement. This bearer is constructed as separate structural part and is supported at the interior door panel by way of two web panels. It is arranged at the door in such a manner that a spacing exists between the hollow bearer and the door outer panel so that in particular in case of a lateral impact the bearer does not become effective immediately and also the door interior panel is deformed in a disadvantageous manner. Moreover, the bearer is costly from a structural and assembly point of view by its additional connection with the web panels as well as by the further connection with the door interior panel. Furthermore, a door for a motor vehicle is described in the DE-OS 27 39 178 in which the lower outer door element consists of plastic material, however, no hollow bearer is provided for safety reinforcement.

It is the object of the present invention to provide a composite door consisting of an upper outer part provided with a window cutout and of a lower outer part connected with the upper outer part, in which an immediate absorption of impact energy is made possible by way of the door lower part and in addition thereto a good repair and assembly possibility of this door lower part itself as well as of built-in parts is assured. Therebeyond, the door lower part is also to be protected against external influences such as stone throw, corrosion, etc.

The underlying problems are solved according to the present invention by a one-piece lower outer part of the door which includes a shell-shaped door outer element with an integrated hollow bearer.

The principal advantages achieved with the present invention reside in that a reinforcement in the form of a hollow bearer supported at the door structure is integrated into the door outer part so that during assembly of the door lower part, the hollow bearer is at the same time also assembled and additional parts and operations for the attachment of the hollow bearer can be dispensed with. Additionally, as a result of the location of the hollow bearer within the connecting area to the upper door outer part, a stability is achieved within the area of the belt line of the door in the otherwise unstable center section.

A simplified assembly for the structural elements arranged on the inside of the door is achieved by the two-partite door outer part and it entails the further advantage that the lower door outer part can be readily exchanged in case of damage.

Additionally, by the two-partite construction, the lower door outer part can be matched corresponding to the requirements for appearance, for the loads as well as for different materials and independently of the upper door outer part which is of advantage with different vehicle types with identical doors.

The lower door outer part is preferably provide with a covering of plastic material which at the same time is so arranged that a circumferential sealing with respect to the door inner panel is achieved.

The door outer part together with integrated hollow bearer thus forms a door reinforced in the critical area in particular against a lateral impact, whereby the hollow bearer is used to a considerable extent for the absorption of impact energy and the force flow is adapted to be introduced well-defined into the door structure.

These and other objects, features and advantages of the present invention will become more apparent from the following description when taken in connection with the accompanying drawing which shows, for purposes of illustration only, two embodiments in accordance with the present invention, and wherein.

Figure 1:
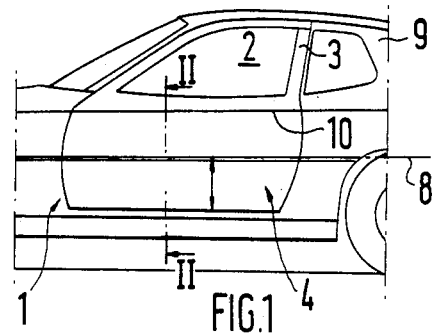
FIG. 1 is a partial side elevational view of a side door of a motor vehicle with a two-partite door in accordance with the present invention.

Referring now to the drawing wherein like reference numerals are used throughout the various views to designate like parts, the door generally designated by reference numeral 1 of a motor vehicle essentially includes an upper outer part 3 having a window cutout 2, which is detachably connected with a further lower outer part generally designated by reference numeral 4 and is secured at the door inner panel 5. The lower outer part 4 includes a shell-shaped door outer element 6 with an integrally arranged hollow bearer 7 extending in the vehicle longitudinal direction which is arranged approximately at the height of the belt line 8 of the vehicle 9. The door outer element 6 and the hollow bearer 7 are preferably constructed in one piece and consist of aluminum or a plastic material. For reinforcing the door outer element 6, the latter may be provided, for example, with ribs 17 extending in the vehicle longitudinal direction.

Figure 5:
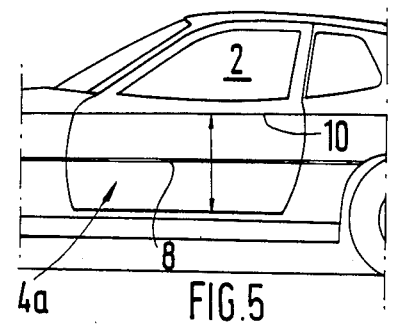
FIG. 5 is a partial side elevational view of a motor vehicle with a further embodiment of a two-partite door in accordance with the present invention.
Figure 2:
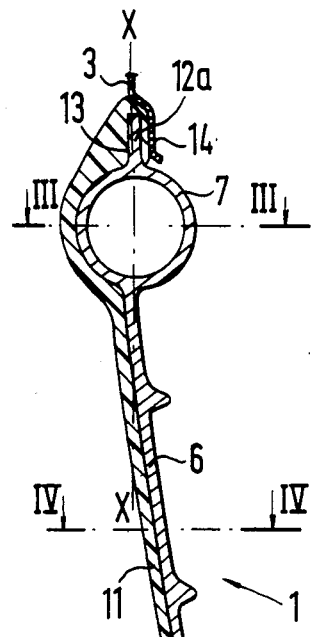
FIG. 2 is a cross-sectional view through the door taken along line II—II of FIG. 1.
Figure 4:
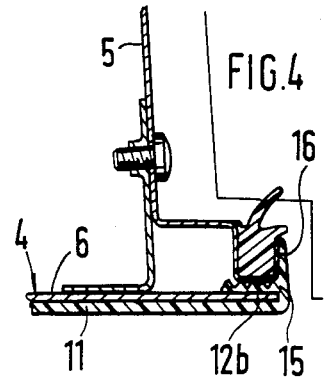
FIG. 4 is a partial cross-sectional view through the right door side taken along line IV—IV of FIG. 2.

The door outer element 6 extends according to a first embodiment according the FIG. 4 from the door lower edge to the belt line 8, as indicated by the dimensional line in FIG. 1. According to a further embodiment according to FIG. 5, the outer element 4a extends from the door bottom edge to the bottom edge 10 of the window cutout 2 as again indicated by the dimensional line. The hollow bearer 7 remains at the height of the belt line 8.

The hollow bearer 7 is preferably constructed circularly shaped in cross section. However, any other geometric cross-sectional shape such as rectangular shape, elliptical shape, etc. is also possible.

The door outer element 6 is arranged approximately in a vertically extending longitudinal center plane X—X with respect to the hollow bearer 7 so that an outwardly directed bulging extending in the vehicle longitudinal direction results which forms, for example, a protective edge for the door.

For the protection of the door outer element 6 against external influences, a covering 11 is provided. The covering 11 consists, for example, of a polyurethane material or of any other protective layer material. This covering 11 is form-lockingly connected with the door outer element 6 in that a tongue-shaped part of the covering is mounted over the circumferential edge areas 12, 12a, 12b, 12c of the door outer element 6, 6a. For example, a mounting groove 13 is provided in the covering 11, into which an upper edge area of the door part 6 is inserted.

The fastening of the lower outer element 6 at the upper door outer part 3 takes place by way of a detachable connection such as a threaded connection, clip connection or the like. For that purpose, the edge 12a of the element 6 is in overlapping position to the edge 14 of the upper outer part 3 whereby the covering 11 is partially clamped-in between the edges 12a and 14.

The covering 11 includes a bead 15 at the door lower edge as well as at the vertical sections which serves simultaneously for the sealing and also for the covering of the terminal edge 16 of the door inner panel 5.

The door outer element 6 is constructed in one-piece with a formed-on, lower horizontally extending leg 18 which is connected in overlapping arrangement with a further leg 16a of a door inner panel.

Figure 3:
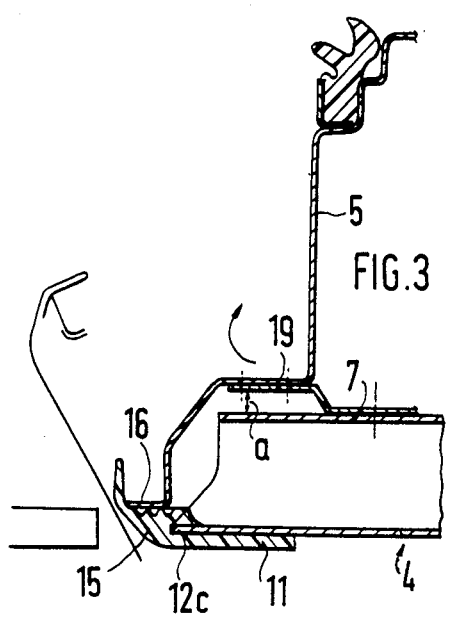
FIG. 3 is a partial cross-sectional view through the left door side taken along line III—III of FIG. 2.

In FIG. 3, the connection of the hollow bearer 7 with the door inner panel 5, respectively, the lateral support is shown. The hollow bearer 7 is connected with the door inner panel by way of a connecting element 19 whereby a spacing "a" is provided between the hollow bearer 7 and the door inner panel 5.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A door for a motor vehicle, comprising an upper outer part provided with a window cutout, a lower outer part connected with the upper outer part, at least one safety reinforcing means arranged within the door, said reinforcing means extending in the vehicle longitudinal direction and constructed as hollow bearer means, the lower outer part of the door being a one-piece unitary lower outer part which includes a shell-shaped door outer element with an integrated hollow bearer means;

wherein the door outer element includes a cover means of plastic material at its outer surface; and wherein the hollow bearer means has a circularly shaped cross section which is adjoined approximately in a vertical longitudinal center plane by the shell-shaped door outer element.

2. A door according to claim 1, wherein the hollow bearer means is arranged approximately at the height of a belt line of the vehicle and the shell-shaped door outer element extends at least up to this belt line.

3. A door according to claim 2, wherein the door outer element includes circumferential edge areas on which the cover means is form-locking retained.

4. A door according to claim 3, wherein the cover means includes bead means extending along at least one of said edge areas and retained at the door outer element, said bead means having an outer edge sealingly surrounding and covering a door inner panel.

5. A door according to claim 4, wherein the upper edge area of the door outer element is arranged overlappingly with respect to a further edge area of the upper door part and both edge areas are connected with each other under interposition of a tongue-shaped part of the cover means.

6. A door according to claim 5, wherein the door outer element includes several reinforcing ribs arranged on the inside and extending approximately in the vehicle longitudinal direction.

7. A door according to claim 6, wherein the door outer element is constructed in one piece with a formed-on lower horizontally extending leg which is connected in overlapping arrangement with a further leg of the door inner panel.

8. A door according to claim 2, wherein the door outer element and the hollow bearer means consist of aluminum.

9. A door according to claim 2, wherein the door outer element and the hollow bearer means consist of plastic material and are covered by a cover means made of a polyurethane material.

* * * * *